US009171009B1

(12) United States Patent
Faibish et al.

(10) Patent No.: US 9,171,009 B1
(45) Date of Patent: Oct. 27, 2015

(54) CLUSTER FILE SYSTEM COMPRISING STORAGE SERVER UNITS EACH HAVING A SCALE-OUT NETWORK ATTACHED STORAGE CLUSTER

(71) Applicant: EMC Corporation, Hopkinton, MA (US)

(72) Inventors: Sorin Faibish, Newton, MA (US); John M. Bent, Los Alamos, NM (US); Uday Gupta, Westford, MA (US); James M. Pedone, Jr., West Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 188 days.

(21) Appl. No.: 13/924,022

(22) Filed: Jun. 21, 2013

(51) Int. Cl.
*G06F 17/30* (2006.01)

(52) U.S. Cl.
CPC .............................. *G06F 17/30194* (2013.01)

(58) Field of Classification Search
None
See application file for complete search history.

(56) References Cited

U.S. PATENT DOCUMENTS

| 8,751,725 B1* | 6/2014 | Gangadharan et al. ....... 711/100 |
| 2011/0191445 A1* | 8/2011 | Dazzi ............................ 709/219 |
| 2012/0079192 A1* | 3/2012 | Jaquette ........................ 711/114 |

OTHER PUBLICATIONS

Polte et al., ". . . And Eat It Too: High Read Performance in Write-Optimized HPC I/O Middleware File Formats," Proceedings of the 4th Annual Workshop on Petascale Data Storage, ACM, 2009, pp. 21-25.*
"daemon", Webopedia Online Tech Dictionary, Accessed on Feb. 18, 2015 from: http://www.webopedia.com/TERM/D/daemon.html.*
EMC Corporation, "EMC Isilon Scale-Out Storage Product Family—Storage Made Simple," 2012, 6 pages.
Cluster File Systems, Inc., "Lustre: A Scalable, High-Performance File System," Nov. 2002, 13 pages.
Feiyi Wang et al., "Understanding Lustre Filesystem Internals," Tech Report: ORNL/TM-2009/117, Apr. 2010, 95 pages.
J. Bent et al., "PLFS: A Checkpoint Filesystem for Parallel Applications," ACM/IEEE Conference on High Performance Computing, Networking, Storage and Analysis, SC09, Nov. 2009, 12 pages.

* cited by examiner

*Primary Examiner* — Alex Gofman
*Assistant Examiner* — Umar Mian
(74) *Attorney, Agent, or Firm* — Ryan, Mason & Lewis, LLP (57) ABSTRACT

A cluster file system comprises storage server units each configured for communication with a plurality of clients over a network. At least one of the storage server units comprises an object storage server, an object storage target associated with the object storage server, a metadata server, a metadata target associated with the metadata server, and a scale-out network attached storage cluster. The scale-out network attached storage cluster comprises storage directories corresponding to respective ones of the object storage and metadata targets. The object storage server and its associated object storage target may form part of a first storage tier of the storage server unit, and a plurality of nodes of the scale-out network attached storage cluster may form part of a second storage tier of the storage server unit. Parallel log-structured file system (PLFS) middleware may be used to control movement of data between the first and second storage tiers.

20 Claims, 5 Drawing Sheets

CLUSTER FILE SYSTEM COMPRISING STORAGE SERVER UNITS EACH HAVING A SCALE-OUT NETWORK ATTACHED STORAGE CLUSTER

FIELD

The field relates generally to data storage, and more particularly to parallel file systems and other types of cluster file systems.

BACKGROUND

A cluster file system allows multiple client devices to share access to files over a network. One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

For example, certain types of highly cost effective storage, such as scale-out network attached storage, are often seen as failing to provide performance characteristics that are adequate for use with supercomputers and other complex computing environments that utilize Lustre file systems.

Accordingly, despite the many advantages of Lustre file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide cluster file systems that comprise multiple storage server units, each of which includes one or more object storage servers and a scale-out network attached storage cluster. For example, one or more of the illustrative embodiments are configured so as to allow a cluster file system to obtain the performance advantages of a flash storage tier as well as the storage capacity and cost benefits associated with use of scale-out network attached storage. Accordingly, implementation of scale-out network attached storage is facilitated in supercomputers and other complex computing environments that utilize Lustre file systems.

In one embodiment, a cluster file system comprises a plurality of storage server units configured for communication with a plurality of clients over a network. At least one of the storage server units comprises an object storage server, an object storage target associated with the object storage server, a metadata server, a metadata target associated with the metadata server, and a scale-out network attached storage cluster. The scale-out network attached storage cluster comprises storage directories corresponding to respective ones of the object storage and metadata targets.

The object storage server and its associated object storage target may form at least a portion of a first storage tier of the storage server unit, and a plurality of nodes of the scale-out network attached storage cluster may form at least a portion of a second storage tier of the storage server unit. In such an arrangement, the storage server unit may further comprise parallel log-structured file system (PLFS) middleware configured to control movement of data between the first and second storage tiers.

It is to be appreciated that other embodiments can include more than one object storage server, object storage target, metadata server or metadata target within a given storage server unit.

As noted above, illustrative embodiments described herein provide significant improvements relative to conventional arrangements. In some of these embodiments, a storage server unit comprises a flash storage tier implemented using one or more object storage servers and a disk storage tier implemented using nodes of a scale-out network attached storage cluster. Such an arrangement facilitates dynamic balancing of storage capacity and IO throughput requirements in a cluster file system, thereby allowing particular levels of performance to be achieved at a significantly lower cost than would otherwise be possible. Also, additional storage server units can be easily brought online to provide increased amounts of capacity and throughput within a given system. Similar improvements are provided in alternative embodiments using other storage server unit configurations.

DETAILED DESCRIPTION

Illustrative embodiments of the present invention will be described herein with reference to exemplary cluster file systems and associated clients, servers, storage arrays and other processing devices. It is to be appreciated, however, that the invention is not restricted to use with the particular illustrative cluster file system and device configurations shown. Accordingly, the term "cluster file system" as used herein is intended to be broadly construed, so as to encompass, for example, distributed file systems, parallel file systems, and other types of file systems implemented using one or more clusters of processing devices, as well as combinations of multiple such file systems.

Figure 1:
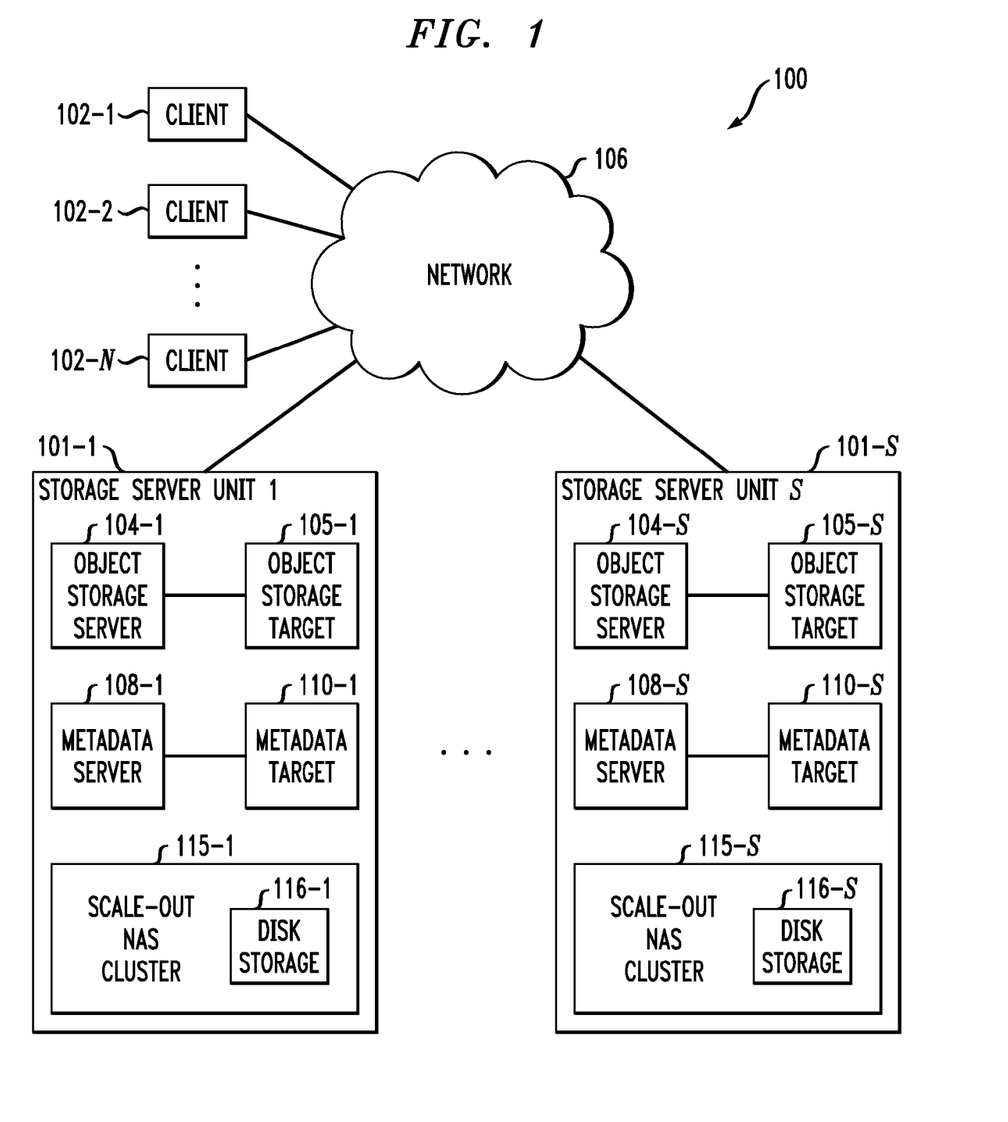
FIG. 1 is a block diagram of a cluster file system having multiple storage server units each comprising an object storage server and a scale-out network attached storage cluster in an illustrative embodiment of the invention.

FIG. 1 shows a cluster file system 100 configured in accordance with an illustrative embodiment of the present invention. The cluster file system 100 comprises a plurality of storage server units 101-1 through 101-S, and a plurality of clients 102-1, 102-2, . . . 102-N. Each of the storage server units 101 comprises an object storage server 104 having an associated object storage target 105, a metadata server 108 having an associated metadata target 110, and a scale-out network attached storage cluster 115 comprising disk storage devices 116. More particularly, storage server unit 101-1 comprises object storage server 104-1 coupled to object storage target 105-1, metadata server 108-1 coupled to metadata target 110-1, and scale-out network attached storage cluster 115-1 comprising disk storage devices 116-1. Similarly, storage server unit 101-2 comprises object storage server 104-2 coupled to object storage target 105-2, metadata server 108-2 coupled to metadata target 110-2, and scale-out network attached storage cluster 115-2 comprising disk storage devices 116-2.

The clients 102 communicate with the object storage servers 104, metadata servers 108 and scale-out network attached storage clusters 115 of the storage server units 101 over a network 106. For example, the metadata servers 108 may receive metadata requests from the clients 102 over the network 106 and transmit responses to those requests back to the clients 102 over the network 106. The metadata servers 108 generally utilize their respective metadata targets 110 in processing the metadata requests received from the clients 102 over the network 106. The metadata targets 110 may each comprise a storage array or other type of storage device. For example, a given metadata target 110 may be implemented at least in part using a flash storage device.

The scale-out network attached storage clusters 115, which are also referred to herein as scale-out NAS clusters, may each comprise a plurality of nodes with each such node comprising one or more disk storage devices 116. These disk storage devices 116 of the scale-out NAS clusters 115 may be implemented using storage arrays.

Storage arrays utilized in the cluster file system 100 may comprise, for example, storage products such as VNX and Symmetrix VMAX, both commercially available from EMC Corporation of Hopkinton, Mass. A variety of other storage products may be utilized to implement at least a portion of the cluster file system 100.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

As will be described in greater detail below in conjunction with the illustrative embodiments of FIGS. 2, 3 and 4, each of the scale-out NAS clusters 115 comprises a plurality of storage directories corresponding to respective ones of the object storage targets 105 and the metadata targets 110. Thus, for example, there may be a one-to-one correspondence between storage directories of a given scale-out NAS cluster 115 in one of the storage server units 101 and the object storage and metadata targets of that storage server unit.

The scale-out NAS clusters 115 of system 100 and other scale-out NAS clusters referred to herein may be implemented, for example, using Isilon storage platforms, such as storage platforms comprising Isilon platform nodes and associated accelerators in the S-Series, X-Series and NL-Series product lines, commercially available from EMC Corporation of Hopkinton, Mass.

Within a particular one of the storage server units 101, the object storage server 104 and its associated object storage target 105 may be viewed as forming at least a portion of a first storage tier of that storage server unit. Also, nodes of the scale-out NAS cluster 115 within the particular storage server unit 101 may be viewed as forming at least a portion of a second storage tier of that storage server unit. Accordingly, each of the storage server units 101 in the present embodiment is illustratively configured to provide a first storage tier comprising an object storage server or OSS storage tier and a second storage tier comprising a scale-out NAS tier. Other storage tiering arrangements may be used in other embodiments. For example, although there are two storage tiers in each storage server unit 101 in this embodiment, it is to be appreciated that more than two storage tiers may be used in one or more of the storage server units in other embodiments.

The object storage targets 105 of the object storage servers 104 may each comprise one or more flash storage devices, such that the OSS storage tiers of the respective storage server units 101 comprise respective flash storage tiers.

The particular numbers of object storage servers 104, object storage targets 105, metadata servers 108, metadata targets 110 and scale-out network attached storage clusters 115 in each storage server 101 may be varied in other embodiments. For example, a given storage server unit may comprise multiple object storage servers, metadata servers or scale-out network attached storage clusters in other embodiments.

Also, although only a single object storage target is associated with each object storage server in FIG. 1, this is by way of example only, and other embodiments may associate multiple object storage targets with each object storage server. Illustrative arrangements of the latter type will be described below in conjunction with FIGS. 2 and 3. Similarly, each metadata server in a given storage server unit may have multiple metadata targets rather than a single metadata target as illustrated in FIG. 1.

Each of the storage server units 101 of the cluster file system 100 is configured to control movement of data between its first and second storage tiers. In the present embodiment, this data movement between storage tiers is assumed to be accomplished at least in part utilizing parallel log-structured file system (PLFS) middleware configured to control migration of data between the first and second storage tiers. Although not explicitly illustrated in FIG. 1, such PLFS middleware may be implemented within each of the storage server units 101.

The use of PLFS facilitates efficient movement of data between the storage tiers of a given storage server unit 101 in a manner that is at least in part responsive to applications running on clients 102 of the cluster file system 100. The PLFS middleware is assumed to provide PLFS-based data migration functionality. The term "data movement" as used herein is intended to be broadly construed, so as to encompass data migration as well as other types of movement of data between storage tiers. For example, the term "data movement" as used herein may also encompass a variety of different types of movement associated with hierarchical storage management (HSM).

Components of the PLFS middleware may be implemented in the object storage servers 104 and metadata servers 108 as well as in the nodes of the scale-out NAS clusters 115. For example, each of the storage tiers may be viewed as implementing a virtual layer of PLFS functionality within the cluster file system 100.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that use of PLFS is not a requirement, and other types of middleware or data movement control arrangements can be used in other embodiments.

The different storage tiers within a given storage server unit 101 in this embodiment comprise different types of storage devices having different performance characteristics. As mentioned previously, each of the object storage servers 104 is assumed to be configured to interface with a corresponding object storage target 105 in the form of at least one flash storage device, and each of the scale-out NAS clusters 115 is assumed to comprise one or more disk storage devices 116.

The flash storage devices of the first storage tier are generally significantly faster in terms of read and write access times than the disk storage devices 116 of the second storage tier. The flash storage devices are therefore considered "fast" devices in this embodiment relative to the "slow" disk storage devices.

Accordingly, each of the storage server units 101 may be characterized in the present embodiment as having a "fast" storage tier and a "slow" storage tier, where "fast" and "slow" in this context are relative terms and not intended to denote any particular absolute performance level. However, numerous alternative tiering arrangements may be used, including arrangements with three or more tiers each providing a different level of performance. The particular storage devices used in a given storage tier may be varied in other embodiments, and multiple distinct storage device types may be used within a single storage tier.

The flash storage devices corresponding to object storage targets 105 may be implemented, by way of example, using respective flash Peripheral Component Interconnect Express (PCIe) cards or other types of memory cards installed in a computer or other processing device that implements the corresponding object storage server 104. Numerous alternative arrangements are possible.

Also, a variety of other types of non-volatile or volatile memory in any combination may be used in place of the flash storage devices. Examples of alternatives to flash storage devices that may be used as respective object storage targets 105 in other embodiments of the invention include non-volatile memories such as magnetic random access memory (MRAM) and phase change random access memory (PC-RAM).

The flash storage devices of the first storage tier within a given storage server unit 101 generally provide higher performance than the disk storage devices 116 of the second storage tier but the disk storage devices 116 generally provide higher capacity at lower cost than the flash storage devices. The exemplary tiering arrangement within each of the storage server units 101 of FIG. 1 therefore makes it possible for each such storage server unit to dynamically balance the conflicting requirements of storage capacity and IO throughput, thereby avoiding situations in which either performance is less than optimal or the costs of implementing the system become excessive. Arrangements of this type can provide further acceleration of IO operations in the cluster file system 100, leading to enhanced system performance relative to conventional arrangements, while additionally or alternatively providing an ability to achieve particular levels of performance at lower cost.

System elements such as clients 102, object storage servers 104, metadata server 108 and nodes of the scale-out NAS clusters 115 may be implemented as respective processing devices each comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "computer program products" storing executable computer program code.

A processing device of the type described above will also generally include network interface circuitry. The network interface circuitry allows the processing device to communicate over the network 106 with other processing devices used to implement other system elements. The network interface circuitry may comprise, for example, one or more conventional transceivers.

The above-noted PLFS middleware may be implemented in the form of software that is stored in one or more memories and executed by one or more processors within one or more processing devices. Such middleware may be viewed as residing between operating system software and application software on the processing devices.

It should be understood that the particular arrangement of system elements illustrated in FIG. 1 is presented by way of example only, and numerous other arrangements are possible. For example, as indicated previously, one or more of the storage server units 101 may each include different numbers of object storage servers 104, object storage targets 105, metadata servers 108, metadata targets 110 and scale-out NAS clusters 115 than the number of such elements explicitly shown in the figure.

The cluster file system 100 may be implemented, by way of example, in the form of a Lustre file system, although use of Lustre is not a requirement of the present invention. Accordingly, servers 104 and 108 need not be configured with Lustre functionality, but may instead represent elements of another type of cluster file system. Examples of illustrative embodiments of the invention that incorporate Lustre functionality will be described below with reference to FIGS. 2, 3 and 4.

Figure 2:
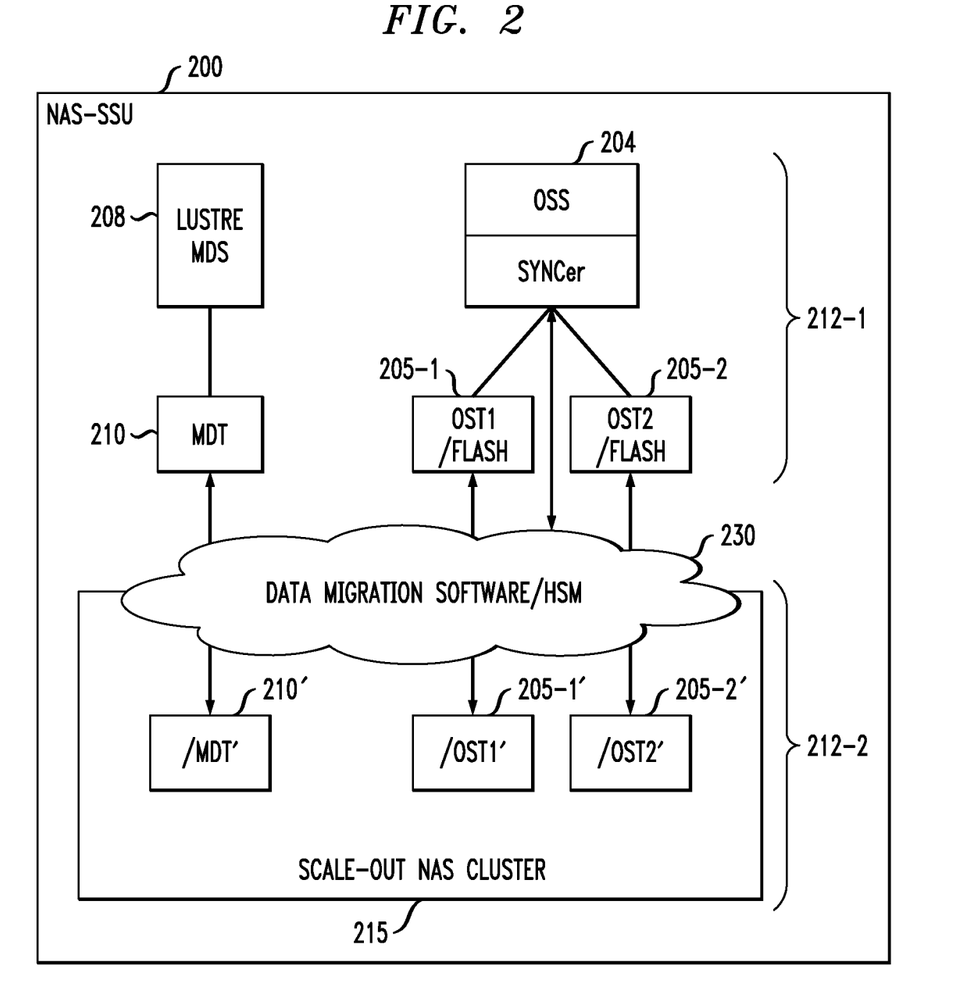
FIG. 2 shows an illustrative embodiment of a storage server unit.

FIG. 2 shows an illustrative embodiment of a storage server unit 200, also referred to as an NAS-SSU. The NAS-SSU 200 may be viewed, for example, as representing one possible Lustre implementation of one of the storage server units 101 of the cluster file system 100 of FIG. 1. The NAS-SSU is assumed to be configured to interface with a plurality of clients over a network, although the clients and network are not shown in this figure. The clients may be more particularly referred to herein as compute nodes (CNs).

As illustrated in FIG. 2, the NAS-SSU 200 comprises an object storage server 204, a plurality of object storage targets 205, a metadata server 208, a metadata target 210, and a scale-out NAS cluster 215. The object storage servers 204, object storage targets 205, metadata server 208 and metadata target 210 are also denoted in this figure as Lustre OSS, OST, MDS and MDT elements, respectively.

The OSS 204 exposes multiple OSTs 205-1 and 205-2 in the present embodiment. These OSTs are also denoted as OST1 and OST2 in the figure. Each of the OSTs 205 is assumed to comprise one or more flash storage devices, although other types of storage devices could be used in other embodiments.

The scale-out NAS cluster 215 comprises storage directories corresponding to respective ones of the OSTs 205 and the MDT 210. More particularly, the scale-out NAS cluster 215 comprises first and second storage directories 205-1' and 205-2' corresponding to the respective OSTs 205-1 and 205-2, and an additional storage directory 210' corresponding to the MDT 210. These storage directories are more particularly denoted as /OST1', /OST2' and /MDT' in the figure.

A given such storage directory of the scale-out NAS cluster 215 implemented in the NAS-SSU 200 in the present embodiment is assumed to comprise a replica of substantially the entire contents of the corresponding OST or MDT, so as to facilitate processing of Lustre data files using PLFS middleware, although other storage directory arrangements could be used in other embodiments.

Multiple CNs external to the NAS-SSU 200 can access the collective data storage capacity of the NAS-SSU using data JO requests directed to the OSSs 204 based on metadata obtained from the MDS 208. The JO requests and other similar requests herein may be configured, for example, in accordance with standard portable operating system interface (POSIX) system calls.

The MDS 208 utilizes the MDT 210 to provide metadata services for the requesting CNs of the cluster file system that contains the NAS-SSU 200. The MDT 210 stores file metadata, such as file names, directory structures, and access permissions.

Additional details regarding conventional aspects of Lustre file systems may be found in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

As indicated previously, it is difficult in conventional Lustre implementations to balance the conflicting requirements of storage capacity and JO throughput. This can lead to situations in which either performance is less than optimal or the costs of implementing the system become excessive.

In the present embodiment, these and other drawbacks of conventional arrangements are addressed by configuring the NAS-SSU 200 to include an OSS storage tier and a scale-out NAS tier. These storage tiers are respectively denoted as first and second storage tiers 212-1 and 212-2 in FIG. 2. The NAS-SSU 200 further comprises data migration software 230 configured to control movement of data between the tiers, possibly including movement associated with HSM as previously indicated.

Although shown for simplicity and clarity of illustration as a separate element arranged between the targets 205 and 210 and the scale-out NAS cluster 215, the data migration software 230 is assumed to be implemented in part within the OSS 204 and in part within the scale-out NAS cluster 215. Portions of the data migration software 230 may additionally or alternatively be implemented in other NAS-SSU elements. The data migration software 230 is assumed to provide PLFS functionality similar to that described above in the context of PLFS middleware. The data migration software 230 may therefore comprise PLFS middleware that resides between operating system software and application software on one or more processing devices used to implement the NAS-SSU 200.

The first storage tier 212-1 of the NAS-SSU 200 comprises the OSS 204 and its associated OSTs 205-1 and 205-2. Different numbers and arrangements of OSSs and OSTs may be used in other embodiments.

The second storage tier 212-2 of the NAS-SSU 200 is assumed to comprise multiple nodes of the scale-out NAS cluster 215, each having one or more disk storage devices associated therewith. These storage devices are used to implement the storage directories 205-1' and 205-2' corresponding to the respective OSTs 205-1 and 205-2, and the additional storage directory 210' corresponding to the MDT 210. Other embodiments need not have this one-to-one correspondence between the OST and MDT components of the first storage tier and the storage directories of the second storage tier.

As in the FIG. 1 embodiment, it is assumed that the OST components of the first storage tier 212-1 are "fast" relative to the "slow" OST' components of the second storage tier 212-2. It was noted above that the OST components of the first storage tier 212-1 are assumed to be implemented using flash storage devices and the corresponding storage directories of the second storage tier 212-2 are assumed to be implemented using disk storage devices. It was also noted above that the flash storage devices generally provide higher performance than the disk storage devices but the disk storage devices generally provide higher capacity at lower cost than the flash storage devices.

The OSS 204 in the present embodiment further comprises a synchronization daemon that is configured to interface with PLFS clients implemented on the CNs. The synchronization daemon in this embodiment is more particularly denoted as a SYNCer component of the OSS 204. This component is an example of a PLFS middleware component of the NAS-SSU 200. It is assumed that the synchronization daemon of the OSS 204 is triggered by operations associated with applications running on the CNs. These operations may include read or write operations, as well as other types of operations.

The first storage tier 212-1 in the present embodiment illustratively stores multiple data files on respective ones of the OSTs 205 in association with a single PLFS file, as will be described in more detail below in conjunction with FIG. 3. These multiple data files associated with a single PLFS file are subject to migration between the first storage tier 212-1 and the second storage tier 212-2. Such a PLFS file herein may comprise, for example, data files or other objects stored on respective ones of the OSTs, or possibly also sub-objects on different OSTs. As will be apparent to those skilled in the art, modifications may be made to conventional PLFS functionality to support these and other arrangements for allowing movement of PLFS files between multiple storage tiers as disclosed herein.

Figure 3:
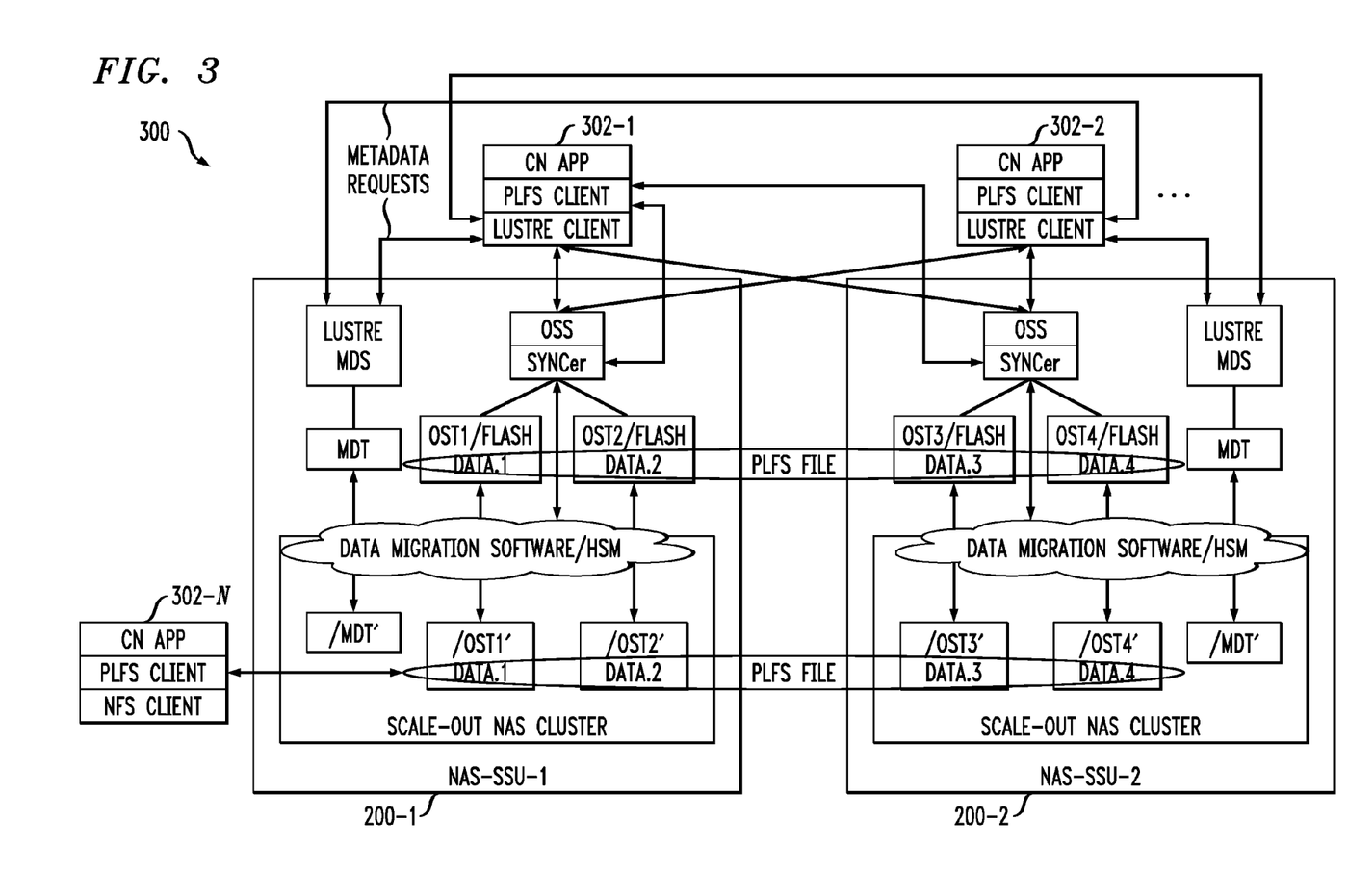
FIG. 3 is a block diagram of a cluster file system comprising multiple storage server units of the type shown in FIG. 2.

A given PLFS file may include data file or other objects or sub-objects from OSTs in different NAS-SSUs, as will be illustrated in greater detail in conjunction with the embodiment of FIG. 3. Accordingly, data migration may be coordinated between multiple NAS-SSUs in a given cluster file system.

After at least a portion of a given PLFS file has been migrated from one of the tiers to the other within an NAS-SSU, it may be deleted from the former tier as appropriate based on application need and other policies implemented in the system, although this particular functionality is not explicitly illustrated in the figure. Movement of the given PLFS file or a portion thereof between the first and second storage tiers may be controlled at least in part based on information provided to the data migration software 230 by one or more of the CN applications running on the CNs.

The multiple data files associated with a given PLFS file or portion thereof migrated from the first storage tier 212-1 to the second storage tier 212-2 within the NAS-SSU 200 are directly accessible within the second storage tier by the CNs without requiring interaction between a given accessing CN and the OSS 204 of the first storage tier 212-1.

The direct access feature described above can be used to facilitate implementation of home directories for the CNs in the scale-out NAS cluster 215. Also, implementation of functionality such as archiving, backups, security and other types of data protection for the CNs is facilitated by providing the CNs with direct access to PLFS files within the scale-out NAS cluster 215. The CNs can determine whether to access PLFS files in flash storage via the OSS 204 or directly on the scale-out NAS cluster 215 based on the particular needs of the applications that are utilizing those files.

In the FIG. 2 embodiment and other Lustre embodiments herein, the OSS 204 utilizes flash storage devices 205 to support high performance IO operations. The scale-out NAS cluster 215 may be viewed as providing a back-end "shadow" file system that stores migratable data files for processing by the OSS while also supporting direct file access and the above-noted home directory and data protection functions for the CNs.

The synchronization daemon of the OSS 204 can initiate migration of PLFS files to and from the scale-out NAS cluster 215 responsive to information received from the CN applications via the corresponding PLFS clients implemented on the CNs. For example, a given application running on one of the CNs may provide an indication of a particular type of specialized processing for a certain job, such as "fast" or "slow" processing associated with the respective first or second storage tiers 212-1 and 212-2. Such information may be utilized by the data migration software 230 to generate migration requests directing movement of corresponding data between the storage tiers. Again, movement of particular PLFS files may be coordinated across multiple NAS-SSUs.

In other situations, such as when there is no application information indicating a particular type of specialized processing for a certain job, a policy engine that is part of the data migration software 230 of the NAS-SSU 200 may determine appropriate tiers to be used for the corresponding data. The resulting policy decision is utilized to generate a migration request. For example, the policy engine may implement a policy that specifies that files having a certain request rate will be kept in the flash storage tier even in the absence of any particular application information.

Referring now to FIG. 3, a cluster file system 300 in an embodiment of the invention comprises a plurality of clients 302-1, 302-2, ... 302-N, and a plurality of NAS-SSUs 200-1 and 200-2. Each of the NAS-SSUs 200 is configured substantially as previously described in conjunction with FIG. 2.

The clients 302 are more particularly referred to as compute nodes (CNs) in this embodiment. Each of the CNs 302 of cluster file system 300 more particularly comprises a CN application, a PLFS client and a Lustre client as illustrated. The PLFS clients of the CNs 302-1 and 302-2 are shown as interfacing with respective synchronization daemons of the respective OSSs of NAS-SSUs 200-1 and 200-2. The synchronization daemons in this embodiment are more particularly denoted as SYNCer components of the respective OSSs. As indicated previously, these components are considered examples of PLFS middleware components of the cluster file system 300. It is assumed that the synchronization daemons of the OSSs of the NAS-SSUs 200-1 and 200-2 are triggered by operations associated with applications running on the CNs 302. These operations may include read or write operations, as well as other types of operations.

The first storage tiers of the respective NAS-SSUs 200-1 and 200-2 in the present embodiment collectively store multiple data files on respective ones of the OSTs in association with a single PLFS file. The multiple data files that form a single PLFS file in this example are denoted as data.1, data.2, data.3 and data.4. These multiple data files associated with a single PLFS file are subject to migration between the first storage tiers of the NAS-SSUs and the second storage tiers of the NAS-SSUs and accordingly are shown as being stored on respective ones of the storage directories of the scale-out NAS clusters in correspondence with the respective OST components of the first storage tiers.

After a given PLFS file has been migrated from one set of first or second tiers to the other, it may be deleted from the former set of tiers as appropriate based on application need and other policies implemented in the system, although this particular functionality is not explicitly illustrated in the figure. Movement of the given PLFS file between the first and second storage tiers of multiple NAS-SSUs may be controlled at least in part based on information provided by one or more of the CN applications running on the CNs 302.

The multiple data files associated with a given PLFS file migrated from the first storage tiers to the second storage tiers are directly accessible within the second storage tier by the CNs 302 of the system 300 without requiring interaction between a given accessing CN and any of the OSSs of the first storage tiers. This advantageous feature of direct access to the migrated PLFS file is illustrated for CN 302-N in FIG. 3. As shown, the PLFS client implemented within CN 302-N can directly access the PLFS file comprising data files data.1, data.2, data.3 and data.4 as stored on the respective OST storage directories of the scale-out NAS clusters of the NAS-SSUs 200.

The direct access feature described above can be used to facilitate implementation of home directories for the CNs 302 in the NAS-SSUs 200. Also, implementation of functionality such as archiving, backups, security and other types of data protection for the CNs is facilitated by providing the CNs 302 with direct access to PLFS files within the scale-out NAS clusters of the NAS-SSUs. The CNs 302 can determine whether to access PLFS files in flash storage via the OSSs or directly on the scale-out NAS clusters based on the particular needs of the applications that are utilizing those files.

Like the embodiment of FIG. 1, the exemplary tiering arrangement of FIG. 3 makes it possible to dynamically balance the conflicting requirements of storage capacity and IO throughput, thereby avoiding situations in which either performance is less than optimal or the costs of implementing the system become excessive.

Also, such an arrangement allows the cluster file system 300 to obtain the performance advantages of a flash storage tier as well as the storage capacity and cost benefits associated with use of scale-out network attached storage. Accordingly, implementation of scale-out network attached storage is facilitated in supercomputers and other complex computing environments that utilize Lustre file systems.

Figure 4:
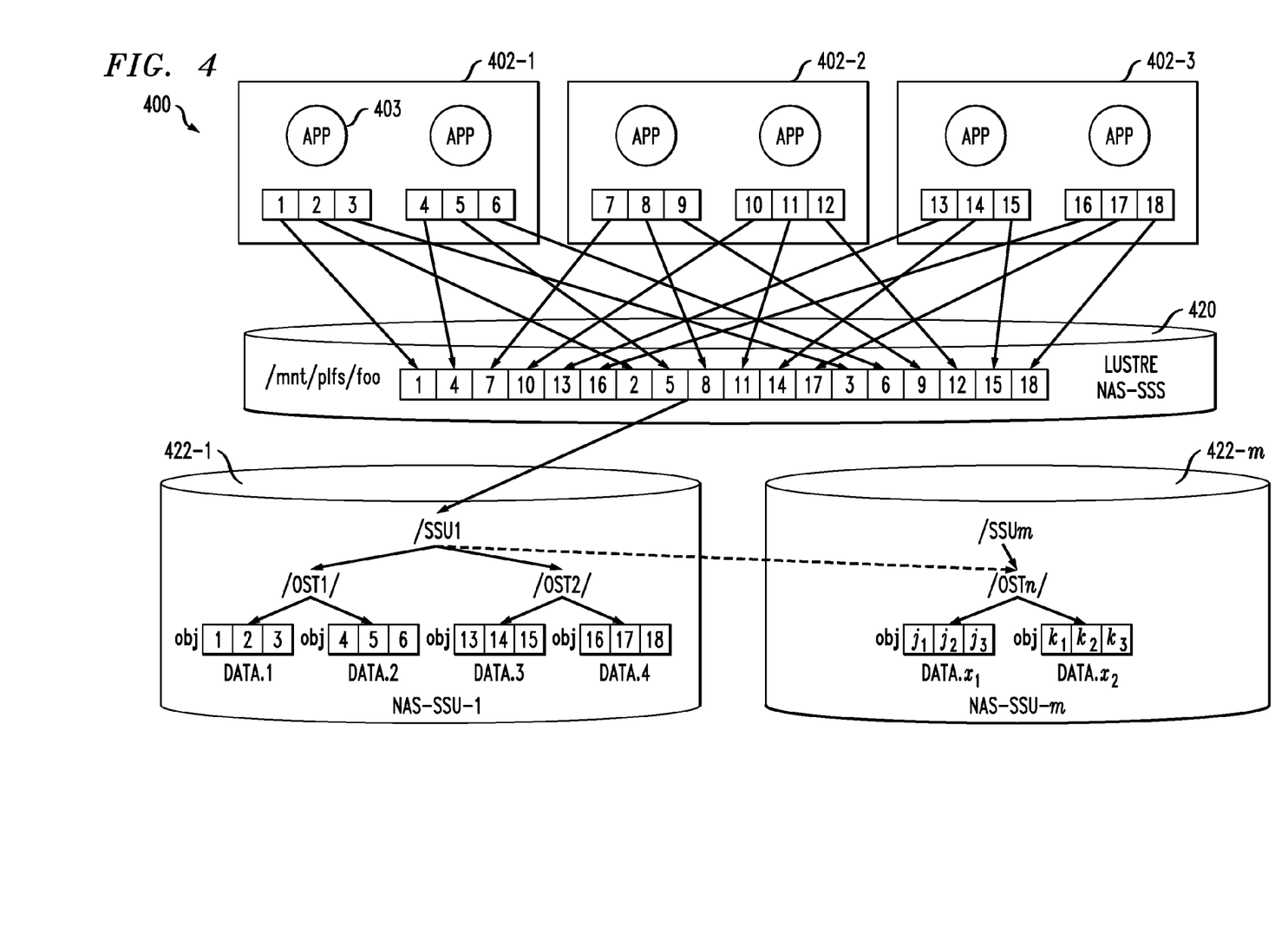
FIG. 4 is a block diagram of a cluster file system having multiple storage server units in another illustrative embodiment.

FIG. 4 shows another cluster file system 400 that includes CNs 402-1, 402-2 and 402-3 each including multiple applications 403. The cluster file system 400 comprises a Lustre storage server system denoted as NAS-SSS 420 arranged between the clients 402 and a plurality of scale-out NAS clusters 422-1 through 422-*m* of respective NAS-SSUs denoted NAS-SSU-1 through NAS-SSU-m. In this embodiment, the NAS-SSS 420 may be viewed as providing at least a portion of an OSS storage tier of the cluster file system 400 and the NAS-SSUs may be viewed as collectively providing at least a portion of a scale-out NAS tier of the cluster file system 400. The particular numbers of CNs 402 and scale-out NAS clusters 422 are exemplary only and in other embodiments different numbers and arrangements of such elements may be used.

It should be noted that the NAS-SSS 420 is assumed to comprise at least part of respective OSS storage tier portions of NAS-SSU-1 through NAS-SSU-m. Thus, OSS and OST components of NAS-SSU-1 through NAS-SSU-m may be collectively implemented in the NAS-SSS 420.

In the FIG. 4 embodiment, as in other embodiments described herein, the OSS storage tier is also referred to as a "fast" storage tier and the scale-out NAS tier is also referred to as a "slow" storage tier. Again, the terms "fast" and "slow" in this context are relative terms and should not be construed as requiring any particular absolute performance levels.

The applications 403 on the first CN 402-1 utilize respective sets of data items 1, 2, 3 and 4, 5, 6. Similarly, the applications 403 on the second CN 402-2 utilize respective sets of data items 7, 8, 9 and 10, 11, 12 and the applications 403 on the third CN 402-3 utilize respective sets of data items 13, 14, 15 and 16, 17, 18. Each of the sets of data items is assumed to collectively comprise a corresponding data file. As illustrated in the figure, these data files are collectively stored in accordance with a particular PLFS file layout on the OSTs that are associated with the OSSs of the OSS storage tier 420. The PLFS file in this example is mounted under a file directory denoted /mnt/plfs/foo.

Different portions of the PLFS file are also stored in different subdirectories of respective high-level directories on respective ones of the scale-out NAS clusters 422. More particularly, the first scale-out NAS cluster 422-1 associated with NAS-SSU-1 has a high-level directory denoted /SSU1. Within this high-level directory are storage directories denoted by subdirectories /OST1 and /OST2 that correspond to respective first and second OSTs within the OSS storage tier portion of NAS-SSU-1. Similarly, the mth scale-out NAS cluster 422-$m$ associated with NAS-SSU-m has a high-level directory denoted /SSUm. Within this high-level directory is a storage directory denoted by a subdirectory /OSTn that corresponds to an OST within the OSS storage tier portion of NAS-SSU-m.

Data files denoted as data.1 and data.2 comprising respective sets of data items 1, 2, 3 and 4, 5, 6 are stored in the subdirectory /OST1 of the first scale-out NAS cluster 422-1 associated with NAS-SSU-1. Data files denoted as data.3 and data.4 comprising respective sets of data items 13, 14, 15 and 16, 17, 18 are stored in the subdirectory /OST2 of the first scale-out NAS cluster 422-1 associated with NAS-SSU-1. The remaining data files comprising sets of data items 10, 11, 12 and 7, 8, 9 may be stored in other subdirectories. For example, data files denoted as data.$x_1$ and data.$x_2$ comprising respective sets of data items $j_1, j_2, j_3$ and $k_1, k_2, k_3$ are stored in the subdirectory /OSTn of the mth scale-out NAS cluster 422-$m$ associated with NAS-SSU-m.

The data files in the FIG. 4 embodiment are also referred to herein as objects, and the data items that make up those data files are also referred to herein as sub-objects of objects.

It should be understood that these particular file and storage arrangements are presented by way of illustrative example only, and should not be construed as limiting in any way. Also, the term "storage directory" as used herein is intended to be broadly construed so as to encompass, for example, a high-level directory or one or more subdirectories of such a high-level directory.

Migration of data between storage tiers in the system of FIG. 4 may be carried out in a manner similar to that previously described in conjunction with FIGS. 2 and 3.

In addition to facilitating dynamic balancing of storage capacity and IO throughput requirements, while reducing implementation costs for particular levels of performance, the illustrative embodiments described above are configured such that additional storage server units can be easily brought online to provide increased amounts of capacity and throughput within a given system. For example, the storage server units can serve as basic building blocks or "bricks" for very large cluster file systems in supercomputers and other complex computing environments.

In such arrangements, Lustre performance is no longer limited to the performance of disk storage devices. The storage server units provide high-performance flash storage devices for Lustre OSSs and OSTs in conjunction with readily scalable scale-out NAS clusters on the backend. Thus, the performance advantages of Lustre and scalability advantages of scale-out NAS clusters such as Isilon storage platforms are obtained in a cluster file system comprising multiple storage server units. The use of PLFS middleware as described above allows Lustre and Isilon to be efficiently combined to form a single cluster file system.

It should be noted with regard to the illustrative embodiments of FIGS. 1 through 4 that relatively minor modifications may be made to one or more applications or other system elements or components in order to achieve additional improvements. For example, a job scheduler or other similar component within the system 100, 300 or 400 can also be modified so as to take full advantage of the available storage tiering functionality. Also, some relatively minor modifications may be made to at least a portion of the object storage servers. For example, object storage servers may be optimized for use with the particular storage device type of their corresponding storage tier.

The exemplary cluster file systems 100, 300 and 400 advantageously obtain the performance advantages of a flash storage tier as well as the storage capacity and cost benefits associated with use of scale-out network attached storage. These embodiments facilitate implementation of scale-out NAS nodes in supercomputers and other complex computing environments that utilize Lustre file systems.

The cluster file systems 100, 300 and 400 or portions thereof as described in conjunction with FIGS. 1 through 4 may be implemented using one or more processing platforms each comprising a plurality of processing devices. Processing modules or other components of these systems may therefore each run on a computer, storage device or other processing platform element. A given such element may be viewed as an example of what is more generally referred to herein as a "processing device."

Figure 5:
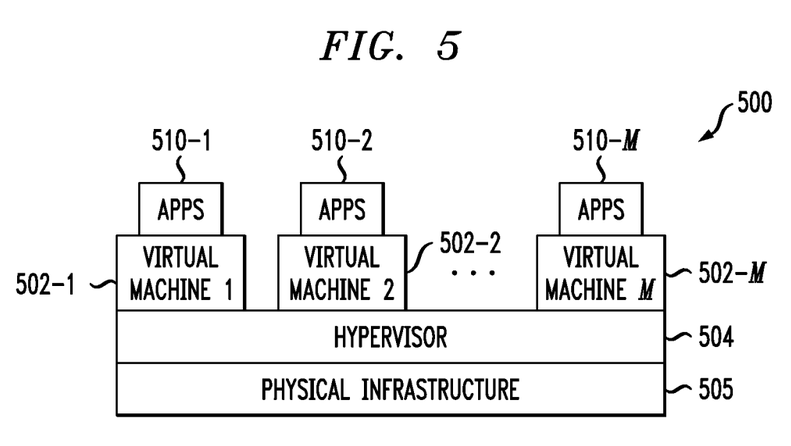
FIGS. 5 and 6 show examples of processing platforms that may be utilized to implement at least a portion of one or more of the cluster file systems or associated storage server units of FIGS. 1 through 4.

Referring now to FIG. 5, one possible processing platform that may be used to implement at least a portion of one or more embodiments of the invention comprises cloud infrastructure 500. The cloud infrastructure 500 in this exemplary processing platform comprises virtual machines (VMs) 502-1, 502-2, . . . 502-M implemented using a hypervisor 504. The hypervisor 504 runs on physical infrastructure 505. The cloud infrastructure 500 further comprises sets of applications 510-1, 510-2, . . . 510-M running on respective ones of the virtual machines 502-1, 502-2, . . . 502-M under the control of the hypervisor 504.

The cloud infrastructure 500 may encompass the entire system 100 or only portions of that system, such as one or more of clients 102, object storage servers 104, object storage targets 105, metadata servers 108, metadata targets 110 and scale-out NAS storage clusters 115. Similar arrangements of cloud infrastructure may be used to implement at least a portion of the systems 300 and 400 of respective FIGS. 3 and 4.

Although only a single hypervisor 504 is shown in the embodiment of FIG. 5, system 100, 200, 300 or 400 may of course include multiple hypervisors each providing a set of virtual machines using at least one underlying physical machine.

An example of a commercially available hypervisor platform that may be used to implement hypervisor 504 and possibly other portions of system 100, 300 or 400 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100, 300 or 400.

Figure 6:
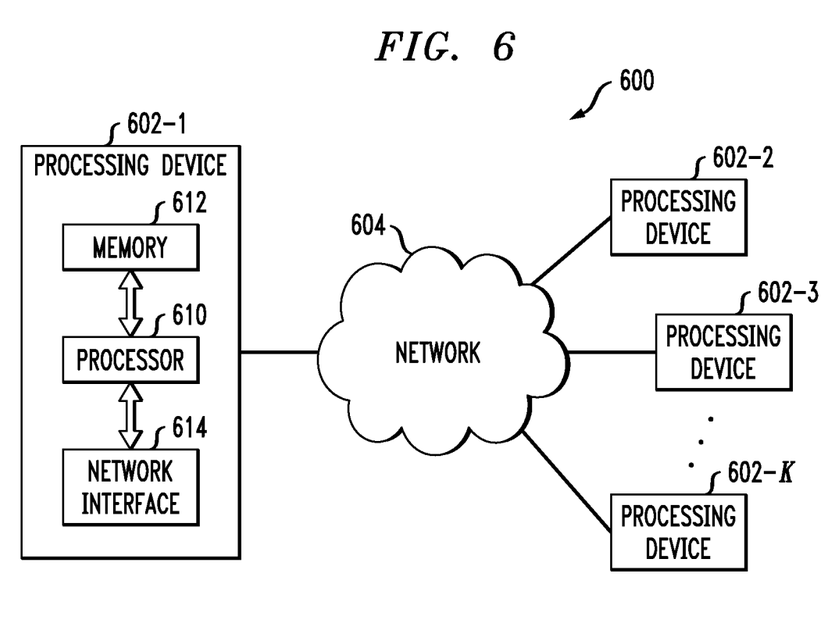

Another example of a processing platform is processing platform 600 shown in FIG. 6. The processing platform 600 in this embodiment comprises at least a portion of one of the systems 100, 300 or 400 and includes a plurality of processing devices, denoted 602-1, 602-2, 602-3, . . . 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "computer program product" having executable computer program code embodied therein, may comprise RAM, ROM or other types of memory, in any combination.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100, 300 or 400 may include additional or alternative processing platforms, as well as numerous distinct processing platforms in any combination, with each such platform comprising one or more computers, storage devices or other processing devices.

Multiple elements of system 100, 300 or 400 may be collectively implemented on a common processing platform of the type shown in FIG. 5 or 6, or each such element may be implemented on a separate processing platform.

As indicated above, cluster file system functionality such as that described in conjunction with FIGS. 1 through 4 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of cluster file systems and associated clients, servers and other processing devices that can benefit from storage server units each comprising an object storage server tier and a scale-out NAS tier as described herein. Also, the particular configurations of system and device elements shown in FIGS. 1 through 4 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A storage server unit comprising:
an object storage server;
a plurality of object storage targets associated with the object storage server;
a metadata server;
a metadata target associated with the metadata server; and
a scale-out network attached storage cluster;
wherein the object storage server and its associated object storage targets form at least a portion of a first storage tier of the storage server unit;
wherein a plurality of nodes of the scale-out network attached storage cluster form at least a portion of a second storage tier of the storage server unit;
wherein the first storage tier provides faster access times than the second storage tier;
wherein the scale-out network attached storage cluster comprises storage directories corresponding to respective ones of the object storage and metadata targets;
wherein multiple data files stored on respective ones of the object storage targets are associated with a single middleware file across those object storage targets, and the single middleware file is also stored in the scale-out network attached storage cluster; and
wherein the storage server unit is implemented utilizing at least one processing device comprising a processor coupled to a memory.

2. The storage server unit of claim 1 wherein the object storage server and the metadata server are configured to communicate with a plurality of clients over a network.

3. The storage server unit of claim 1 further comprising parallel log-structured file system (PLFS) middleware configured to control movement of data between the first and second storage tiers.

4. The storage server unit of claim 3 wherein the PLFS middleware comprises a synchronization daemon implemented in the object storage server.

5. The storage server unit of claim 4 wherein the synchronization daemon is controlled at least in part based on information provided by an application running on a client adapted for communication with the object storage server.

6. The storage server unit of claim 1 wherein the multiple data files associated with the single middleware file stored in the scale-out network attached storage cluster are directly accessible by a client without requiring interaction between the client and the object storage server having the associated object storage targets.

7. The storage server unit of claim 1 wherein at least one of the object storage targets comprises at least one non-volatile electronic storage device including one or more of flash, magnetic random access memory (MRAM) and phase change random access memory (PC-RAM).

8. The storage server unit of claim 1 wherein at least a subset of the nodes of the scale-out network attached storage cluster comprise respective disk storage devices.

9. A processing platform comprising the storage server unit of claim 1.

10. The storage server unit of claim 1 wherein the scale-out network attached storage cluster implements a home directory for a client.

11. The storage server unit of claim 1 wherein there is a one-to-one correspondence between the storage directories of the scale-out network attached storage cluster and the object storage and metadata targets.

12. A method comprising:
associating an object storage server with a plurality of object storage targets;
associating a metadata server with a metadata target;
configuring a scale-out network attached storage cluster to comprise storage directories corresponding to respective ones of the object storage and metadata targets;
wherein the object storage and metadata servers, object storage and metadata targets and the scale-out network attached storage cluster are part of a storage server unit;
configuring a first storage tier of the storage server unit to include the object storage server and its associated object storage targets; and
configuring a second storage tier of the storage server unit to include a plurality of nodes of the scale-out network attached storage cluster;
wherein the first storage tier provides faster access times than the second storage tier; and
wherein multiple data files stored on respective ones of the object storage targets are associated with a single middleware file across those object storage targets, and the single middleware file is also stored in the scale-out network attached storage cluster.

13. The method of claim 12 further comprising
controlling movement of data between the first and second storage tiers.

14. The method of claim 13 wherein controlling movement of data between the first and second storage tiers comprises controlling movement of the single middleware file between the first and second storage tiers at least in part based on information provided by an application running on a client adapted for communication with the object storage server.

15. A computer program product comprising a non-transitory processor-readable storage medium having encoded therein executable code of one or more software programs, wherein the one or more software programs when executed on one or more processing platforms cause the method of claim 12 to be performed.

16. A cluster file system comprising:
a plurality of storage server units configured for communication with a plurality of clients over a network;
at least one of the storage server units comprising:
an object storage server;
a plurality of object storage targets associated with the object storage server;
a metadata server;
a metadata target associated with the metadata server; and
a scale-out network attached storage cluster;
wherein the object storage server and its associated object storage targets form at least a portion of a first storage tier of the at least one storage server unit;
wherein a plurality of nodes of the scale-out network attached storage cluster form at least a portion of a second storage tier of the at least one storage server unit;
wherein the first storage tier provides faster access times than the second storage tier;
wherein the scale-out network attached storage cluster comprises storage directories corresponding to respective ones of the object storage and metadata targets;
wherein multiple data files stored on respective ones of the object storage targets are associated with a single middleware file across those object storage targets, and the single middleware file is also stored in the scale-out network attached storage cluster; and
wherein said at least one storage server unit is implemented utilizing at least one processing device comprising a processor coupled to a memory.

17. The system of claim 16 wherein the cluster file system comprises at least one of a distributed file system and a parallel file system.

18. The system of claim 16 wherein the multiple data files associated with the single middleware file stored in the scale-out network attached storage cluster are directly accessible by a client without requiring interaction between the client and the object storage server having the associated object storage targets.

19. The system of claim 16 wherein the scale-out network attached storage cluster implements a home directory for a client.

20. The system of claim 16 wherein there is a one-to-one correspondence between the storage directories of the scale-out network attached storage cluster and the object storage and metadata targets.

* * * * *